United States Patent Office 2,846,476
Patented Aug. 5, 1958

2,846,476

REMOVAL OF FORMATE IONS FROM PENTA-ERYTHRITOL SOLUTIONS

Arthur L. Glasebrook, Wilmington, Del., assignor to Hercules Powder Company, Wilmington, Del., a corporation of Delaware No Drawing. Application February 7, 1957
Serial No. 638,694

9 Claims. (Cl. 260—637)

The present invention relates to a process for producing pentaerythritol and more particularly to the production of pentaerythritol of high purity.

Pentaerythritol is commonly prepared by condensation of acetaldehyde with formaldehyde in an aqueous alkaline medium. The crude product of this reaction normally comprises an aqueous solution of pentaerythritol and polypentaerythritols, such as dipentaerythritol and tripentaerythritol, and also contains substantial quantities of undesirable components, including unreacted formaldehyde (free formaldehyde), pentaerythritol-formaldehyde condensation products (syrupy byproducts containing bound formaldehyde), metal ions, and formate ions. The metal ion that is most often present is the calcium ion because calcium hydroxide is most commonly used as catalyst for the reaction.

An object of the present invention is the provision of a process which is particularly useful for the removal of formate ions from an aqueous solution of pentaerythritol containing such ions but which is also useful for the removal of calcium ions and both free and bound formaldehyde if such latter contaminants are present.

Prior investigators have spent much time and effort in attempting to develop methods by which the undesirable components of a pentaerythritol reaction mixture can be removed so that the pentaerythritol can then be recovered in a purer form. It is disclosed, for example, in U. S. 2,749,370 to Brendlein et al. that the simple heat treatment of a pentaerythritol reaction mixture containing the usual syrupy byproducts facilitates the recovery of substantially higher yields of pentaerythritol than is possible without such heat treatment. It would appear that the effect of the heat treatment is to remove bound formaldehyde thereby converting at least a portion of the syrupy byproducts to pentaerythritol. It is also disclosed in the aforesaid patent that if a reducible metal oxide, i. e., an oxide of copper, mercury, cadmium, or zinc, is also present in an amount approximately equivalent to the quantity of calcium formate in the pentaerythritol reaction mixture, the calcium formate is converted to calcium carbonate and the metal oxide is reduced to a lower valent form, e. g., to the metallic state. In other words, the reducible metal compound reacts stoichiometrically with calcium formate to convert the calcium formate to insoluble calcium carbonate which can be separated by filtration. An unattractive feature of the latter process is that the reducible metal oxide, once having been reduced, must be reoxidized before it can be used again in the process.

In accordance with this invention it has been found that certain materials, specifically nickel and noble metals, behave as catalysts for the destruction of formate ion that is present in an aqueous solution of pentaerythritol when said solution is heated to an elevated temperature. This catalytic destruction of the formate ion takes place either when the formate ion is present in the solution as formic acid, in which case the formate ion is apparently converted into carbon dioxide and hydrogen, or when the formate ion is present as calcium formate, in which case calcium formate is converted to calcium carbonate which is insoluble and easily separated from the solution. Both free and bound formaldehyde, if such contaminants are present, are also removed although the above catalysts do not appear to influence the removal of such contaminants.

Concisely stated, the process of the invention comprises heating an aqueous solution of pentaerythritol containing formate ions to a temperature from about the atmospheric reflux temperature of the solution up to about 250° C. in the presence of a substance selected from the group of nickel and noble metals whereby the formate ion content of said solution is reduced. A significant feature of the process is that the catalyst remains unchanged during the process and can be recovered and reused without reactivation.

As already explained, it is immaterial to the success of the invention whether the formate ions in the pentaerythritol solution be associated with hydrogen ions or with calcium ions because in either case the formate ions are converted to materials which are evolved or easily removed from the solution. Therefore, if desired, an aqueous solution of pentaerythritol containing calcium formate can be subjected to pretreatment with an acid, e. g., sulfuric acid or oxalic acid, to precipitate calcium ions in the form of a calcium salt which precipitate is then separated from the solution physically. The precipitant can be any acid capable of forming a water-insoluble compound with calcium ions and is preferably sulfuric acid or oxalic acid. Following the pretreatment, the resulting pentaerythritol solution containing formate ions as formic acid can then be treated in accordance with the invention to destroy the formate ions.

In a modification of the invention, a pentaerythritol solution which contains formaldehyde (especially bound formaldehyde), in addition to formate ions, is subjected to a preliminary heat treatment at a temperature ranging from about 160–330° C. in the absence of nickel or a noble metal. This pretreatment removes substantially all of the formaldehyde. By combining either or both of the aforesaid pretreatments with the process of the invention, aqueous solutions of pentaerythritol can be freed substantially completely from formaldehyde, and calcium and formate ions.

The following examples illustrate the process of this invention. All parts and percentages are by weight unless otherwise specified. The pentaerythritol reaction product mixtures utilized were prepared by the reaction of acetaldehyde and formaldehyde in the presence of calcium hydroxide in accordance with the customary well known procedures. Total formaldehyde and bound formaldehyde concentrations were determined by the well known chromotropic acid procedure.

EXAMPLE 1

A pentaerythritol reaction product mixture in the amount of 1533 parts prepared by reacting acetaldehyde and formaldehyde in the presence of lime and having the composition shown in Table I was charged into a stainless steel autoclave along with 31 parts commercial 5% palladium-on-charcoal catalyst (0.83% palladium based on pentaerythritol). The autoclave was fitted with a pressure reflux condenser, a metering valve to control pressure at a constant bleed-off and a nitrogen sparging device. The autoclave was heated to 230° C. over a period of about 1 hour and heat was maintained at 230° C. for 2 hours while the pressure was held constant at 420 p. s. i. A nitrogen sparge averaging 0.12 C. F. M. was maintained to furnish agitation and to remove gases formed. The solution was then cooled and filtered to remove the catalyst and the precipitate. The results of the treatment appear in Table I.

*Table I*

| | Charge, percent | Results |
|---|---|---|
| Pentaerythritol | 12 | 103.3% retained. |
| Total Formaldehyde | 2 | 95.6% destroyed. |
| Formate Ion | 6 | 91.3% destroyed. |
| Sulfate Ash | 8 | 98.0% eliminated. |

EXAMPLE 1A

The procedure of Example 1 was repeated with the omission of catalyst. The results were as follows:

Pentaerythritol _____ 104.2% retained.
Total formaldehyde _____ 95.6% destroyed.
Formate ion _____ 31.5% destroyed.
Sulfate ash _____ 67.2% eliminated.

The preceding examples taken in comparison show the effect of palladium as a catalyst for the destruction of formate ion. As observed, however, the palladium had little effect on the removal of formaldehyde from the reaction mixture since formaldehyde was destroyed to an equivalent extent even in the absence of the catalyst.

EXAMPLE 2

A pentaerythritol reaction product mixture in the amount of 1800 parts and having the same composition as the mixture in Example 1 was charged to a stainless steel rocking type autoclave along with 36 parts of a commercial 5% palladium-on-carbon catalyst. After flushing and testing to 1000 p. s. i. with nitrogen, the pressure was bled to atmospheric. The reactor was then heated with agitation to 230° C. over a period of 1.25 hours. Heating was continued for 2 hours at 230° C., the pressure increasing during this time from 2000 p. s. i. to 2800 p. s. i. The reaction mixture was then cooled to room temperature, removed from the autoclave, and filtered. The results of the treatment appear in Table II.

*Table II*

| | Charge, percent | Results |
|---|---|---|
| Pentaerythritol | 12 | 105.8% retained. |
| Total Formaldehyde | 2 | 98.8% destroyed. |
| Sulfate Ash | 8 | 96.0% eliminated. |
| Formate Ion | 6 | 87.2 destroyed. |

EXAMPLE 2A

The procedure of Example 2 was repeated with the omission of the palladium catalyst. The percent formate ion destroyed decreased to 31.5% and the percent ash eliminated decreased to 27%.

EXAMPLE 3

A pentaerythritol reaction product mixture in the amount of 500 parts and having the same composition as the mixture of Example 1 was charged to a reaction vessel fitted with a stirrer, nitrogen sparge tube, and reflux condenser along with 50 parts of commercial Raney nickel catalyst which had been maintained under distilled water and comprised about 65% solids. The solution was heated at reflux under nitrogen with agitation for 18 hours and then cooled. Seventy-two and six-tenths parts of catalyst and solids were filtered off and 425 parts of filtrate, 50 parts of water used in washing the autoclave, and 50 parts of fresh water-wet Raney nickel were recharged into the reaction vessel. This solution was heated at reflux with agitation under nitrogen for 4 additional hours, and then cooled. Fifty-eight and one-tenth parts of catalyst and solids were again filtered off and the filtrate was recharged to the reaction vessel with 50 parts of fresh water-wet commercial Raney nickel catalyst. This solution was heated at reflux with agitation under nitrogen for 6 hours and then cooled. Solids and catalyst (43.5 parts total) were removed. The clear filtrate was concentrated to yield a crop of crystals (67.4 parts) having the analysis shown in Table III.

*Table III*

Pentaerythritol _____ 88.9% (99.3% recovery).
Total formaldehyde _____ 0.83%.
Sulfate ash _____ 0.25%.

EXAMPLE 4

A pentaerythritol reaction product mixture having the same composition as the composition of Example 1 was heated in a closed autoclave at 230° C. for 2 hours. The results of the treatment are shown in Table IV.

*Table IV*

| | Charge, percent | Results |
|---|---|---|
| Pentaerythritol | 12 | 107.0% retained. |
| Total Formaldehyde | 2 | 99.8% destroyed. |
| Sulfate Ash | 8 | 22.5% eliminated. |

This pretreated pentaerythritol reaction product mixture in the amount of 3707 parts was charged to a reaction vessel along with 100 parts distilled wash water and 74 parts commercial 5% palladium-on-charcoal catalyst. A vigorous reaction evolving a gas started immediately. Stirring agitation in conjunction with a nitrogen sparge was started and continued at room temperature for 90 hours with the evolution of considerable carbon dioxide gas. The solution was then heated to reflux and refluxing together with a nitrogen sparge continued for 97 hours. After cooling the reaction mixture, the catalyst and calcium carbonate precipitate were filtered off and amounted to 480 parts (wet weight). A portion of the filtrate in the amount of 401 parts was concentrated and the pentaerythritol crystallized therefrom in two batches which were then combined. This product (59.8 parts) had the composition shown in Table V.

*Table V*

Pentaerythritol _____ 87.2% (90% recovery).
Dipentaerythritol _____ 12.3%.
Total formaldehyde _____ 0.02%.
Sulfate ash _____ 0.04%.

The remaining filtrate (2926 parts) was heated with just sufficient oxalic acid to precipitate any calcium ions present and 8.8 parts (dry weight) calcium oxalate was removed by filtration. The filtrate was concentrated to a weight of 2598 parts. A portion of the filtrate in the amount of 420 parts was concentrated to dryness and then dried overnight at 120° C. A slightly yellow solid in the amount of 79.4 parts was obtained and ground with a mortar and pestle. The product had the analysis shown in Table VI.

*Table VI*

Pentaerythritol _____ 84.8% (98.5% recovery).
Dipentaerythritol _____ 12.6%.
Sulfate ash _____ 0.65%.
Total formaldehyde _____ 0.13%.

The remaining portion of oxalic acid treated filtrate (2178 parts) was concentrated and 408.7 parts of pentaerythritol crystallized out in several batches. The crystals had the analysis shown in Table VII.

*Table VII*

Pentaerythritol _____ 89.1% (102% recovery).
Total formaldehyde _____ 0.01%.
Sulfate ash _____ 0.02%.

EXAMPLE 5

A pentaerythritol reaction product mixture in the amount of 3000 parts and having a composition similar to the mixture of Example 1 was agitated with 180.5 parts of 98.5% $H_2SO_4$. After filtration of the reaction mixture, a portion of the filtrate (analysis—Table VIII) in the amount of 1500 parts along with 0.72 part of commercial 5% palladium-on-carbon catalyst was charged to a stainless steel autoclave fitted with a pressure reflux condenser and a nitrogen sparge. Nitrogen sparge was started and furnished agitation. The reaction mixture was heated to 250° C. over a period of 2 hours and heating was continued at 250° C. for 8 hours. Pressure during the reaction was maintained at 250 p. s. i. Following the treatment, the solution was filtered and analyzed. The results of these analyses are shown in Table VIII.

*Table VIII*

|  | Charge, percent | Results |
| --- | --- | --- |
| Pentaerythritol | 12.6 | 92% retained. |
| Total Formaldehyde | 1.45 | 77% destroyed. |
| Formate Ion | 5.80 | 90% destroyed. |

EXAMPLE 5A

The procedure of Example 5 was repeated with the omission of catalyst. Only 38.5% of the formate ion was destroyed.

EXAMPLE 6

A pentaerythritol reaction product mixture having the same composition as that in Example 1, in the amount of 500 parts was charged, along with 10 parts of a commercial 5% palladium-on-carbon catalyst, to a reaction vessel fitted with a stirrer and a sparging tube. While maintaining atmospheric pressure, the reaction mixture was agitated and the reaction vessel sparged with nitrogen. A large amount of carbon dioxide was evolved. The reaction mixture was stirred under reflux and a nitrogen sparge for 17.5 hours. The catalyst was filtered, washed with hydrochloric acid and recharged into the vessel together with the mother liquor. Heating under nitrogen and reflux conditions with agitation was then continued for 28 hours. The catalyst was separated by filtration and the filtrate was treated with oxalic acid. A precipitate comprising 4.5 parts of calcium oxalate was removed by filtration. The solution was then heated to boiling for several hours with 10 parts of a commercial 5% palladium-on-carbon catalyst to destroy any formic acid present. The catalyst was filtered off and the filtrate concentrated to crystallize the pentaerythritol present. The crystals were separated by filtration and the mother liquor further concentrated to separate a second batch of crystals. Analysis of the crystalline pentaerythritol (64.8 parts) is shown in Table IX.

*Table IX*

| | |
| --- | --- |
| Pentaerythritol | 91.2% (94% recovery). |
| Dipentaerythritol | 7.89%. |
| Total formaldehyde | 0.34%. |
| Sulfate ash | 0.03%. |
| Formate ion | Nil. |

EXAMPLE 7

A pentaerythritol reaction product mixture similar to that of Example 1, in the amount of 400 parts was charged to an autoclave and the temperature raised to 215° C. over a period of 2.0 hours under autogenous pressure. Heating was continued for 2 hours, maintaining the temperature at 215° C. The reaction mixture was then cooled, washed from the autoclave, and the liquor was separated by filtration from 4.1 parts of solids which were formed during the heat treatment. The filtrate was then concentrated to remove the water added during the washing of the autoclave, and charged to a reaction vessel along with 8 parts commercial 5% palladium-on-carbon catalyst. Agitation at room temperature produced a vigorous reaction accompanied by the evolution of gas. The solution was heated to reflux, over a period of about 1 hour and refluxed with agitation and a nitrogen sparge for 10 hours and then cooled. The catalyst was separated by filtration, washed with hydrochloric acid and then with water and recharged into the reaction vessel along with the reaction liquor. Heating at reflux continued for 18 hours after which the reaction mixture was cooled and the catalyst separated by filtration. The filtrate was treated with sufficient oxalic acid to adjust the pH to 4. One and one-tenth parts of calcium oxalate was then filtered off. The liquor was concentrated to about 150 parts and 44.9 parts of crystals were removed. A second crystallization yielded 11.9 parts of additional crystals which were combined with the first crop. Analysis of this pentaerythritol is shown in Table X.

*Table X*

| | |
| --- | --- |
| Pentaerythritol | 91.3% (108% recovery). |
| Dipentaerythritol | 7.93%. |
| Total formaldehyde | 0.00%. |
| Sulfate ash | 0.007%. |
| Formate ion | Nil. |

Thus, by subjecting the pentaerythritol reaction product mixture to a pretreatment comprising heating in the absence of a catalyst and then heating the pretreated pentaerythritol in the presence of a hydrogenation catalyst, formaldehyde had been completely destroyed and substantially entirely all the calcium formate had been removed as shown by the low ash and formate ion content of the product.

As the examples have shown, an aqueous solution of pentaerythritol that contains formate ions can be freed from the formate ions by heating in the presence of nickel or a noble metal. The noble metal in the examples has been illustrated by palladium but other noble metals, such as platinum, rhodium, and ruthenium, are also effective catalysts in the process of the invention. The catalysts may be utilized either in the form of finely-divided metal or supported on suitable carriers such as carbon, alumina, silica, and the like and is used in an amount ranging from about 0.1% to about 10% based on the weight of pentaerythritol in the aqueous solution. About 0.2% to 3% catalyst is preferred. In the case of supported catalysts, the percentage is, of course, based on the amount of nickel or noble metal contained therein.

The process is effective at any temperature ranging from about the atmospheric reflux temperature of the aqueous solution up to about 330° C. However, temperatures above 250° C. result in destruction of pentaerythritol so that temperatures above 250° C. should be used only where pentaerythritol yield is of secondary importance. Thus, temperatures from about the reflux temperature up to about 250° C. are ordinarily preferred.

It is convenient to carry out the process of the invention under autogenous pressure. However, any pressure that is achievable with the apparatus at hand can be utilized.

It is helpful also to sparge the aqueous solution prior to and during the heating with a gas such as nitrogen or carbon dioxide in sufficient quantity to agitate the solution. This enhances the rate of destruction of formate ions. With or without a sparge, however, mechanical agitation is advantageous.

Although the heating of the pentaerythritol solution in the presence of nickel or a noble metal also destroys or removes a major proportion of formaldehyde, it is desirable, when complete removal of formaldehyde is desired, to pretreat the aqueous solution of pentaerythritol in the absence of nickel or a noble metal at a temperature of from about 160° C. to 330° C. Temperatures above 200° C. for this type of pretreatment are preferred when the object is to destroy or remove bound formaldehyde. This pretreatment is effective when carried out for as short a period as ¼ minute at 330° C. up to about 30 minutes at any temperature above about 200° C. Heat treatment for longer than is necessary to reduce the total formaldehyde concentration to a desired level should be avoided because of a detrimental effect upon pentaerythritol yield.

In the application of the process of this invention to a pentaerythritol reaction product mixture, the mixture may be treated immediately following its formation or the reaction product mixture may be stored prior to treatment. A pentaerythritol reaction product mixture to be treated immediately following its formation needs no stabilization. However, it is desirable that the pH of the mixture be about 5 or higher. Pentaerythritol in reaction product mixtures having pH values of less than about 5 tends to decompose rapidly reducing the quantity of desirable product available for recovery.

If there is to be some delay between formation of the pentaerythritol reaction product mixture and treatment thereof in accordance with this invention, it is desirable that the reaction product mixture be stabilized to prevent deterioration. Storage of the mixture without stabilization results in an undesirable change of color or a partial destruction of pentaerythritol content or both, depending upon temperature, storage time, etc.

Stabilization of a pentaerythritol reaction product mixture may be effected by adjustment of its pH. The particular pH adjustment in any given instance will be dictated by the conditions tending to produce deterioration. If a pentaerythritol reaction product mixture is to be stored at, say, room temperatures or a temperature less than about 160° C., it is necessary that the pH of the mixture be adjusted to the range of about 5–9 by addition of a suitable acid such as formic acid. At pH values above about 9 under these temperature conditions, color develops as a result of an aldehyde reaction and at pH values below about 5, pentaerythritol tends to decompose. Adjustment of the pH to the range of 6–8 provides excellent protection from deterioration and this is the preferred range.

The process of this invention may be carried out in a batch or continuous system. Because the time required can be short, the advantages of the invention can be best realized using a continuous system. Heat may be applied to a continuous reactor externally through the wall of the vessel or by introducing steam into the feed stream. The presence of steam under such conditions minimizes the tendency of calcium compounds to produce scaling. On the other hand, heating the reaction mixture indirectly, i. e., through the walls of the vessel, has certain advantages in that bound formaldehyde appears to be more completely destroyed by this means and there is also less attendant destruction of desirable organic compounds.

As mentioned above, the process of this invention may be utilized to remove formate ions from commercial pentaerythritol but is particularly useful for application to pentaerythritol reaction product mixtures. In treating a commercial pentaerythritol, the pentaerythritol is dissolved in a convenient quantity of a suitable solvent such as water and the resulting solution is heated in accordance with this invention. The amount of solvent is not critical but it is convenient to use about a 30% solution. A pentaerythritol reaction product mixture may be treated directly following its formation. Thus, the product resulting from the condensation of acetaldehyde and formaldehyde in the presence of calcium hydroxide may be treated either before or after removal of calcium ions and may be pretreated or not in accordance with the procedures desired.

This application is a continuation-in-part of application Serial No. 410,700, filed February 16, 1954, now abandoned.

What I claim and desire to protect by Letters Patent is:

1. The process which comprises heating an aqueous solution of pentaerythritol containing formate ions at a temperature ranging from the atmospheric reflux temperature of the solution up to 330° C. in the presence of a substance selected from the group consisting of nickel and palladium whereby the formate ion content is reduced.

2. The process of claim 1 in which said substance is present in the amount of about 0.01% to about 10% based on the weight of pentaerythritol.

3. The process of claim 2 in which said substance is palladium.

4. The process of claim 2 in which said substance is nickel.

5. The process for removing calcium and formate ions from an aqueous solution of pentaerythritol containing such ions which comprises adding an acid capable of forming a water-insoluble compound with calcium ions thereby precipitating calcium from said solution up to 330° C. and then heating the resulting solution at a temperature ranging from the atmospheric reflux temperature in the presence of a substance selected from the group consisting of nickel and palladium whereby the formate ion content is reduced.

6. The process of claim 5 in which said substance is present in the amount of about 0.01% to about 10% based on the weight of pentaerythritol.

7. The process of claim 5 in which said substance is palladium.

8. The process of claim 5 in which said substance is nickel.

9. The process for removing formaldehyde and formate ions from an aqueous solution of pentaerythritol containing the same which comprises heating said solution to a temperature above 200° C. to destroy formaldehyde and then heating said solution at a temperature ranging from the atmospheric reflux temperature up to 330° C. in the presence of a substance selected from the group consisting of nickel and palladium whereby the formate ion content is reduced.

References Cited in the file of this patent

UNITED STATES PATENTS

| 2,329,514 | Cox | Sept. 14, 1943 |
| 2,651,662 | Russell | Sept. 8, 1953 |
| 2,749,370 | Brendlein | June 5, 1956 |

OTHER REFERENCES

Hackh's "Chemical Dictionary" (3rd. edit.), Blakiston Co., Philadelphia, Pa., 1944; p. 581.

Webster's "New International Dictionary" (2nd. edit.), unabridged, Noble metal.